(12) United States Patent
Alba

(10) Patent No.: US 8,596,701 B2
(45) Date of Patent: Dec. 3, 2013

(54) ANCHOR HOIST RING ASSEMBLY

(75) Inventor: Tony J. Alba, Covina, CA (US)

(73) Assignee: MJT Holdings LLC, Valdosta, GA (US)

( * ) Notice: Subject to any disclaimer, the term of this patent is extended or adjusted under 35 U.S.C. 154(b) by 0 days.

(21) Appl. No.: 13/486,378

(22) Filed: Jun. 1, 2012

(65) Prior Publication Data

US 2012/0306226 A1  Dec. 6, 2012

Related U.S. Application Data

(60) Provisional application No. 61/492,500, filed on Jun. 2, 2011.

(51) Int. Cl.
*B66F 19/00* (2006.01)
(52) U.S. Cl.
USPC ............... 294/215; 294/89; 403/78; 403/194
(58) Field of Classification Search
USPC ........ 294/215, 82.1, 89; 403/78, 79, 119, 164
See application file for complete search history.

(56) References Cited

U.S. PATENT DOCUMENTS

| | | | | |
|---|---|---|---|---|
| 3,297,293 | A * | 1/1967 | Andrews et al. | 248/499 |
| 4,641,986 | A * | 2/1987 | Tsui et al. | 403/164 |
| 5,352,056 | A * | 10/1994 | Chandler | 403/79 |
| 5,405,210 | A * | 4/1995 | Tsui | 403/119 |
| 6,032,993 | A * | 3/2000 | Kwon | 294/215 |
| 8,201,867 | B2 * | 6/2012 | Thomeczek | 294/215 |

* cited by examiner

*Primary Examiner* — Stephen Vu
(74) *Attorney, Agent, or Firm* — Lance Pritikin, Esq.

(57) ABSTRACT

A hoist ring assembly with expansion anchor includes an anchor subassembly and a rotatable and pivotable lifting loop. The anchor subassembly includes a bushing element, an engagement element and a retainer element. The bushing element has an anchor shaft extending along a major axis. The engagement element has a threaded bore extending long a bore axis which is approximately parallel to the major axis when the assembly is in assembled state. The threaded bore is adapted to threadably receive a threaded portion of the retainer element. The bore axis may be forced out of alignment with the major axis by way of a tightening rotation of the threaded portion with respect to the threaded bore, thus expanding the effective diameter of the combined anchor shaft and engagement element. The assembly is thereby releasably anchorable to a pre-drilled hole in a load to be lifted.

18 Claims, 5 Drawing Sheets

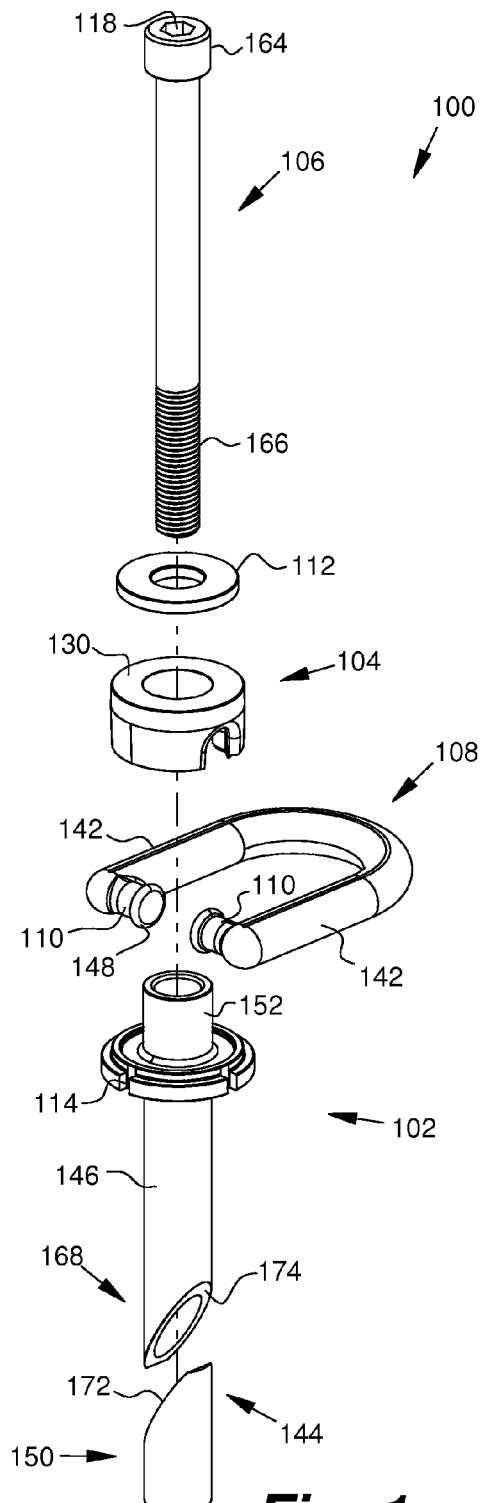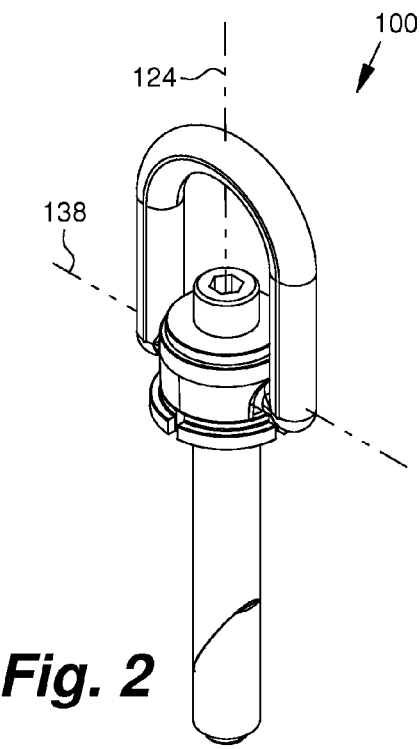
Fig. 2
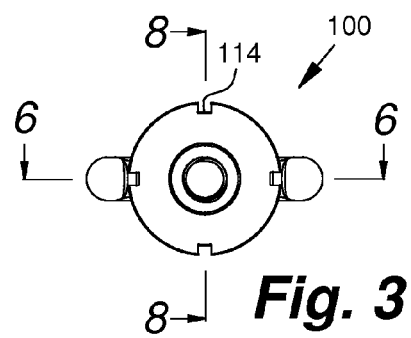
Fig. 3
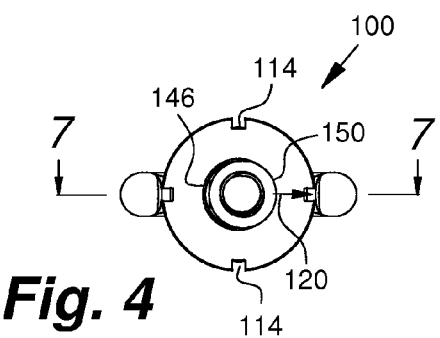
Fig. 4
Fig. 1

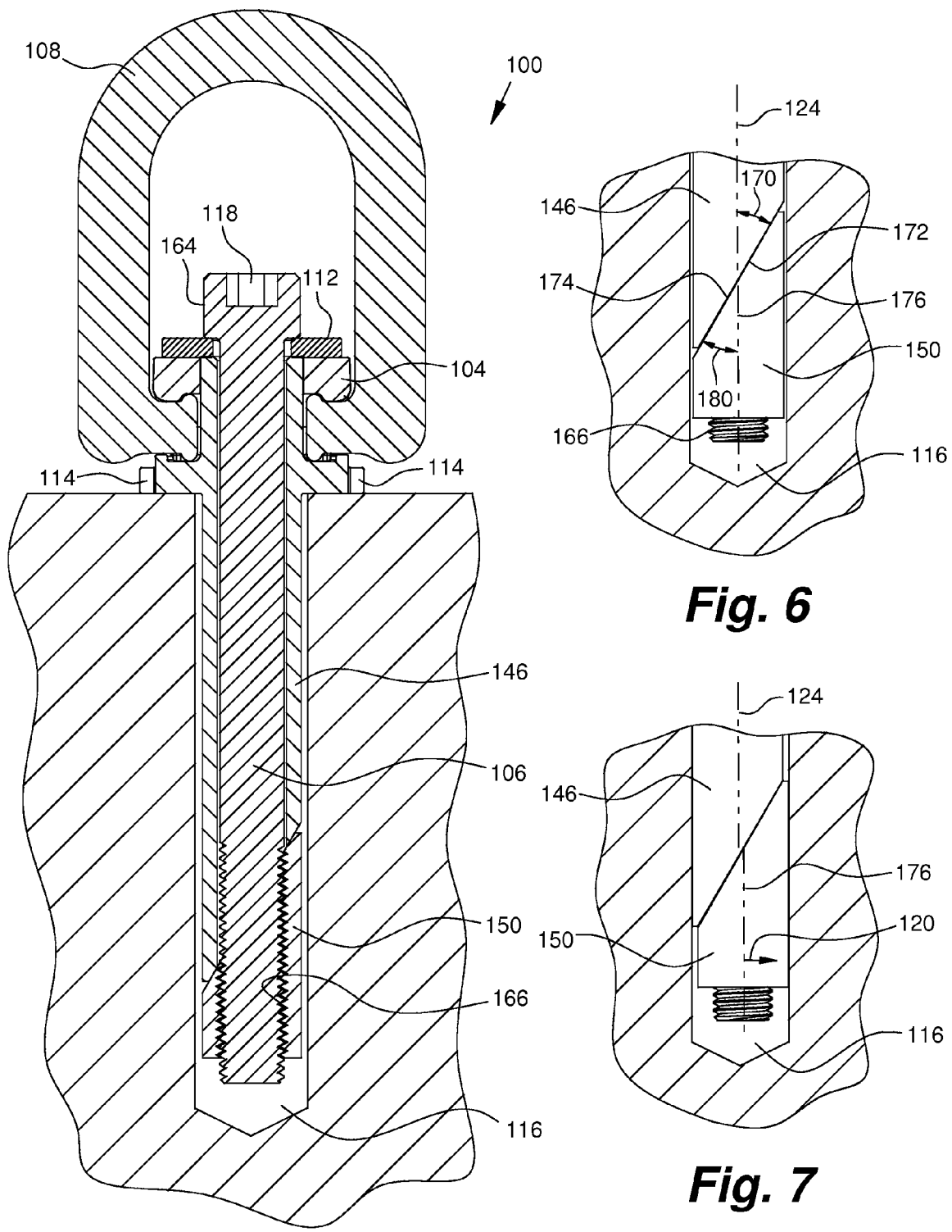

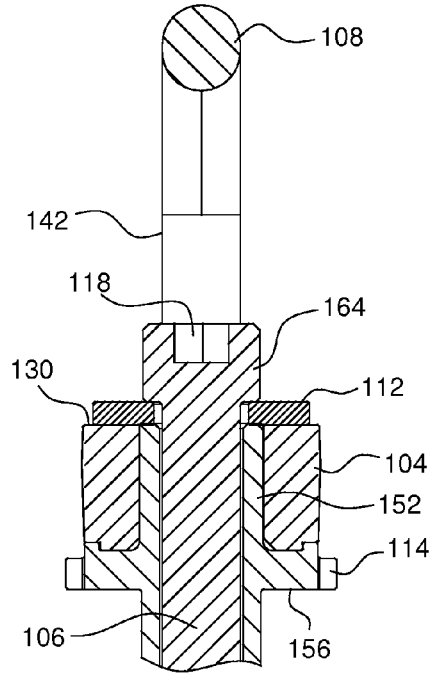
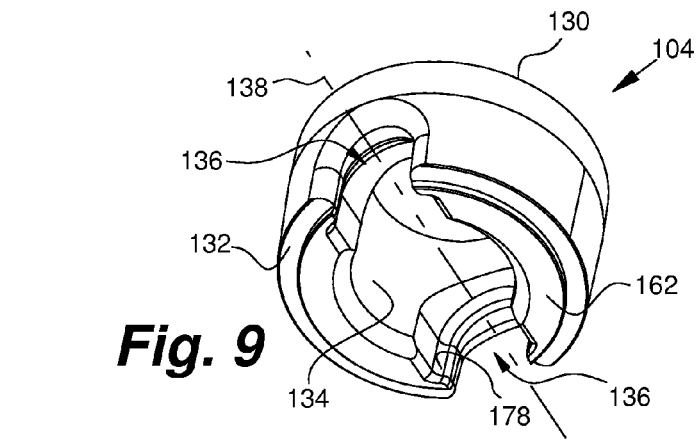
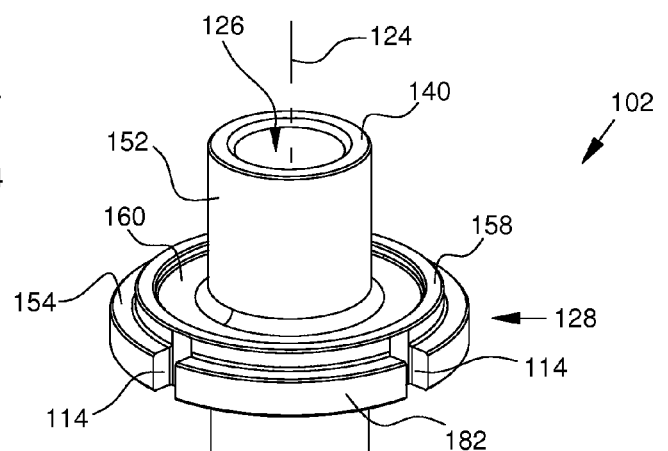
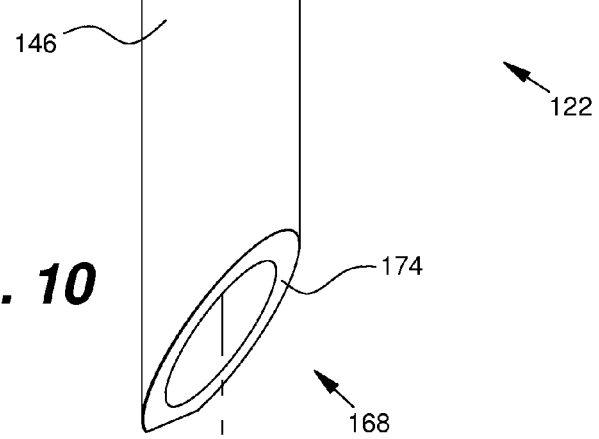

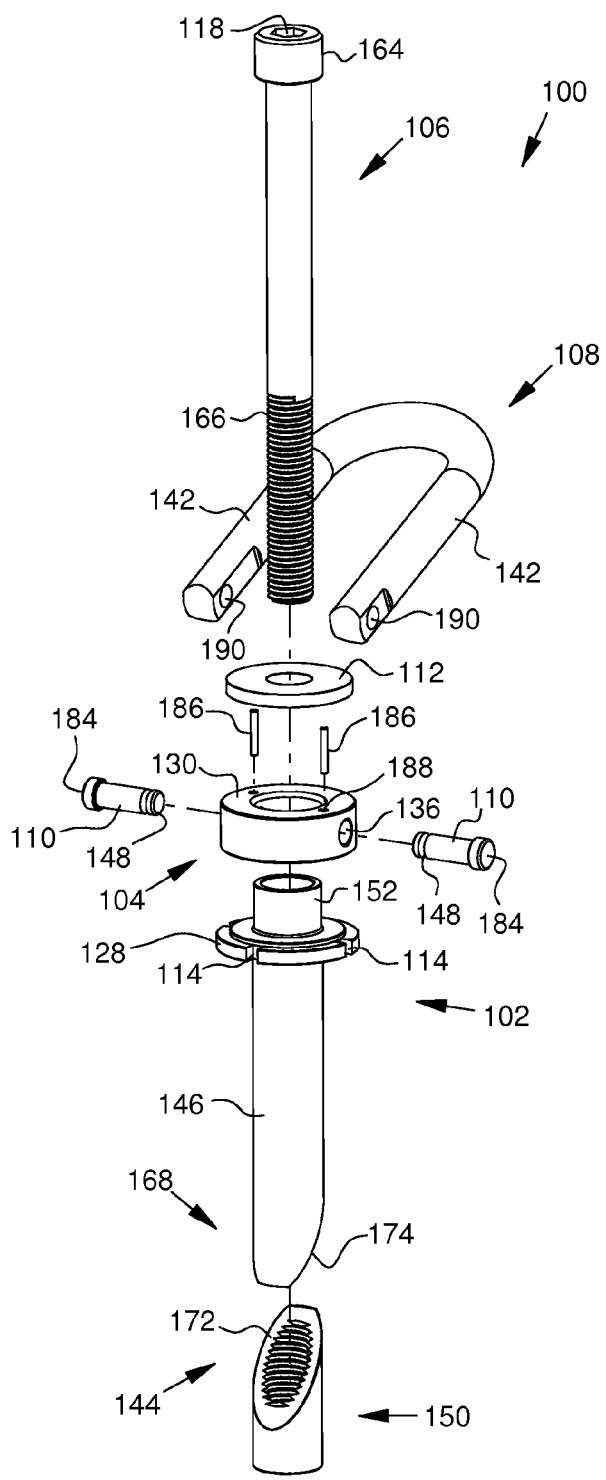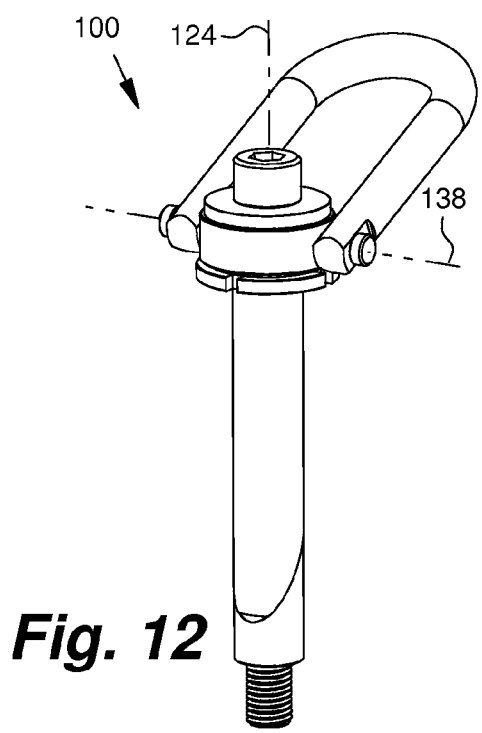
Fig. 11
Fig. 12

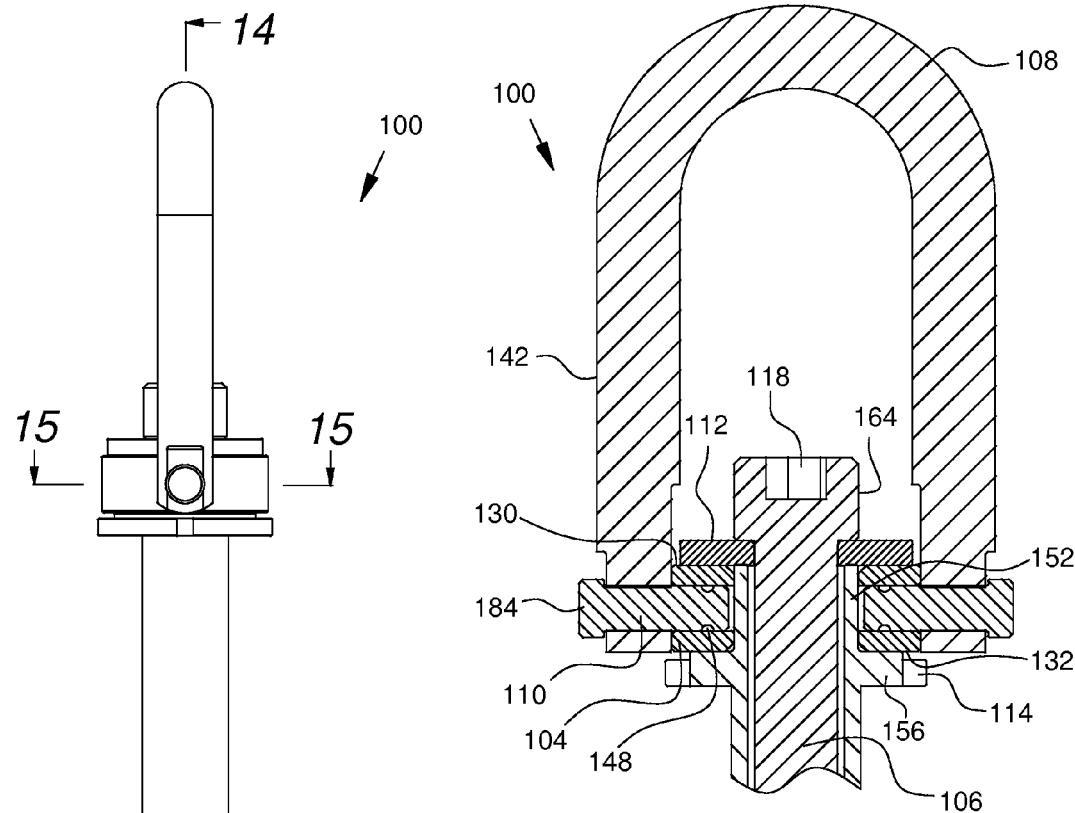
Fig. 13
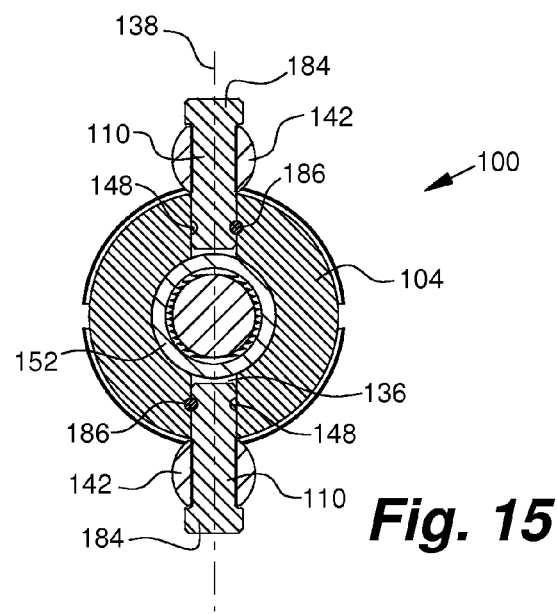

ANCHOR HOIST RING ASSEMBLY

RELATED APPLICATIONS

This application claims the benefit of U.S. Provisional Application No. 61/492,500 filed Jun. 2, 2011, the content of which is incorporated by this reference in its entirety for all purposes as if fully set forth herein.

TECHNICAL FIELD

The present invention relates generally to the field of hoist ring assemblies. More particularly, the invention concerns hoist ring assemblies capable of being releasably self-anchored to a pre-drilled unthreaded hole in concrete and the like.

BACKGROUND

Hoist rings are commonly used as a universal interface for lifting very heavy objects. Conventional hoist ring assemblies are typically adapted to be placed in welded or threaded engagement with the load to be lifted. However, certain loads may not be constructed of materials appropriate to form part of a weld or threaded interface, such as certain articles formed of concrete. Further, forming weld joints and threaded interfaces may require the involvement of a skilled welder or machinist, resulting in an corresponding increase in the cost to form such interfaces. What is needed is an inexpensive, reliable hoist ring assembly capable of rapidly anchoring to pre-formed bores or apertures in the load to be lifted, and rapidly disengaging for removal therefrom.

SUMMARY

Certain deficiencies of the prior art may be overcome by the provision of one or more embodiments of an anchor hoist ring assembly with expansion anchor. The anchor hoist ring assembly generally comprises an anchor subassembly and a lifting loop element. The anchor subassembly typically includes a bushing element, a retainer element, a fastener element, and an engagement element. The bushing element may have a cylindrical portion with a retainer engagement section and an anchor shaft section and extending generally along a major axis, a bushing bore extending axially through the cylindrical portion, and a flange portion extending generally radially outward from the cylindrical portion generally between the retainer engagement section and the anchor shaft section. The flange portion may have a radially outer periphery and a tool engagement portion. The tool engagement portion may comprise a notch at the radially outer periphery. The notch may be engaged by a torquing tool for applying a torque to the bushing element about the major axis. The anchor shaft section may have a distal end including a distal face disposed at a distal angle with respect to the major axis.

The retainer element may have a first end and a second end, a retainer bore extending therebetween, and a pair of stud sockets disposed opposingly along a minor axis. The retainer bore may be adapted to be in rotatable receiving engagement with the retainer engagement section when the hoist ring assembly is in its assembled configuration. The fastener element may have a fastener head and a threaded portion and be adapted to extend throughout the bushing bore.

The engagement element may have a threaded bore and a proximal end. The threaded bore may extend along a bore axis and be adapted to threadedly receive the threaded portion. The proximal end may include a proximal face disposed at a proximal angle with respect to the bore axis. The proximal face and distal face may be adapted to slidably engage one another for radial movement of the bore axis out of alignment with the major axis. Such radial movement may be inducible at least in part by way of a tightening rotation of the threaded portion with respect to the threaded bore.

The lifting loop element typically includes a pair of legs, each of which have a respective pivot stud adapted to be receivingly engaged by a respective one of the stud sockets. As a result, when the hoist ring assembly is in its assembled configuration, the lifting loop element is connect to the anchor subassembly and is rotatable through a generally 360-degree angle about the major axis with respect to the bushing element with the minor axis remaining generally perpendicular to the major axis, and pivotable through at least a 180-degree angle about the minor axis with respect to the anchor subassembly.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIG. 1 is a diagrammatic exploded view of an embodiment of an anchor hoist ring assembly;

FIG. 2 is a diagrammatic perspective view of the embodiment shown in FIG. 1, but shown in assembled configuration;

FIG. 3 is a diagrammatic bottom view of the embodiment shown in FIG. 1, shown in release configuration;

FIG. 4 is a diagrammatic bottom view of the embodiment shown in FIG. 1, but shown in anchoring configuration;

FIG. 5 is a diagrammatic cross-sectional view taken along line 6-6 of FIG. 3, and in which the anchor shaft and engagement element have been inserted into a pre-formed hole in an object;

FIG. 6 is a diagrammatic partial cross-sectional view taken along line 6-6 of FIG. 3, showing the engagement element in release configuration;

FIG. 7 is a diagrammatic partial cross-sectional view taken along line 7-7 of FIG. 4, showing the engagement element in anchoring configuration;

FIG. 8 is a diagrammatic fragmentary cross-sectional view along line 8-8 of FIG. 3;

FIG. 9 is a diagrammatic perspective view of a retainer element from the embodiment shown in FIG. 1;

FIG. 10 is a diagrammatic perspective view of a bushing element from the embodiment shown in FIG. 1;

FIG. 11 is a diagrammatic exploded view of a further embodiment of an anchor hoist ring assembly;

FIG. 12 is a diagrammatic perspective view of the embodiment shown in FIG. 11, but shown in assembled configuration;

FIG. 13 is a diagrammatic side view of the embodiment shown in FIG. 12;

FIG. 14 is a diagrammatic partial cross-sectional view taken along line 14-14 of FIG. 13; and FIG. 15 is a diagrammatic cross-sectional view taken along line 15-15 of FIG. 13.

DETAILED DESCRIPTION OF THE PREFERRED EMBODIMENTS

Referring now to the drawings, like reference numerals designate identical or corresponding features throughout the several views.

Embodiments of an anchor hoist ring assembly are shown generally at 100. An anchor hoist ring assembly 100 may comprise an anchor subassembly and a lifting loop element 108. The anchor subassembly may include a bushing element 102, a retainer element 104, a fastener element 106 and an engagement element 150.

Referring to FIG. 10 for illustration, a bushing element 102 extends generally along a major axis 124 and has a cylindrical portion 122 with a retainer engagement section 152 and an anchor shaft section 146. A bushing bore 126 typically extends axially through the cylindrical portion 122. A flange portion 128 extends generally radially outward from the cylindrical portion 122 generally between the retainer engagement section 152 and the anchor shaft section 146. The flange portion may have a reverse face 156, an obverse face 154, a flange lip 158 protruding therefrom, and an annular groove 160 generally disposed between the flange lip 158 and the cylindrical portion. The flange portion 128 may have one or more tool engagement portions (one type of such a tool engagement portion being shown, for example, at 114). The anchor shaft section 146 may have a distal end 168.

Referring now to FIGS. 9 and 11 for illustration, a retainer element 104 may have a first end 130 and a second end 132, a retainer bore 134 extending therebetween, a pair of stud sockets 136 disposed opposingly along a minor axis 138. In embodiments such as the one depicted in FIGS. 1 through 10, each stud socket may have respective slot opening at generally the second end 132. The retainer element 104 may have a boss member 162 protruding from the second end 132 and adapted to be received by the annular groove 160 in rotatably slidable fashion. The retainer bore 134 is adapted to be in rotatable receiving engagement with the retainer engagement section 152 when the anchor hoist ring assembly 100 is in an assembled configuration (as shown, for example, in FIGS. 2 and 5).

A fastener element 106 has a fastener head 164 and a threaded portion 166 and being adapted to extend throughout the bushing bore 126. The fastener head 164 may feature a polygonal recess 118 for receivingly engaging a tool to aid in the rapid and tight securement of the anchor hoist ring assembly to a load, object or substrate and removal therefrom.

An engagement element 150 may have a proximal end 144 and a threaded bore, the threaded bore extending along a bore axis 176. In fact, the threaded bore may be entirely or partially threaded along its length. The threaded bore is adapted to threadedly receive the threaded portion 166 of the fastener element 106. The proximal end 144 and the distal end 168 each have respective forms which are complimentary to each other such that when the fastener element 106 extends through the bushing bore 126 and is threadedly received by the threaded bore, additional rotation (e.g., in the tightening direction) can increasingly force the bore axis 176 out of alignment with the major axis 124 (see, for example, FIG. 7). In certain embodiments, such as those shown for example throughout the several figures, the anchor shaft section 146 and the engagement element 150 may have outer diameters which are substantially the same.

As illustrated, for example, in FIG. 7, in which the engagement element 150 is shown in its anchoring configuration, additional tightening rotation of the fastener element 106 with respect to the engagement element 150 results in the bore axis 176 shifting off-axis with the major axis 124 of the bushing element 102 in first direction 120. This expands the farthest distance between the outer surface of the anchor shaft 146 and the outer surface of the engagement element 150, thereby axially securing (e.g., by way of frictional engagement) the bushing element 102 within pre-formed hole 116 in a load, object or substrate. The bushing bore 126 has a bushing bore diameter larger than the diameter of the shaft of the fastener element 106, thus allowing the fastener element 106 to slightly shift laterally and, in some cases, off-angle, to the main axis 124 to accommodate the movement of the engagement element 150 from its release configuration (as shown, for example, in FIG. 6) toward its anchoring configuration (as shown, for example, in FIG. 7).

The load, object or substrate featuring a pre-formed hole 116 may be one intended to be lifted by way of the anchor hoist ring assembly 100, or relied on to secure or provide leverage for another object by way of a hoist ring assembly 100. An embodiment of the hoist ring assembly 100 is particularly well-suited to being anchored to concrete in which a pre-formed hole 166 has been drilled. The outer surfaces of the anchor shaft section 146, engagement element 150, or both, may include features such as ridges, grooves, knurling or the like, to provide increased frictional engagement between the anchor subassembly and the pre-formed hole 116 when the engagement element is in its anchoring configuration.

Turning to FIGS. 1 and 11 for illustration, a lifting loop element 108 has a pair of legs 142. Each leg 142 may have a respective inwardly-turned pivot stud 110 (or separate pivot studs 110, as shown, for example in FIGS. 11-15) adapted to be receivingly engaged by a respective one of the stud sockets 136 such that when the hoist ring assembly 100 is in the assembled configuration (as shown, for example, in FIGS. 2 and 5) the lifting loop element 108 is connected to the anchor subassembly and is rotatable through a generally 360-degree angle about the major axis 124 with respect to the bushing element 102 with the minor axis 138 remaining generally perpendicular to the major axis 124, and pivotable through at least approximately a 180-degree angle about the minor axis 138 with respect to the anchor subassembly.

Turning to FIGS. 6 and 10 for illustration, in certain embodiments of an anchor hoist ring assembly 100, the form of the distal end 168 includes a distal face 174 disposed at a distal angle 170 with respect to the major axis 124, and the form of the proximal end 144 includes a proximal face 172 disposed at a proximal angle 180 with respect to the bore axis 176. In such embodiments, the distal angle 170 and proximal angle 180 may be approximately equal. In certain preferred embodiments, the proximal and distal angles may be approximately 30 degrees. In other embodiments, the proximal and distal angles may be between 20-40 degrees or 25-35 degrees, for example. Referring to FIGS. 6 and 7 for illustration, in particular embodiments, the proximal face 172 and distal face 174 may be adapted to slidably engage one another for radial movement of the bore axis 176 out of alignment with the major axis 124. The radial movement may be inducible at least in part by way of a tightening rotation of the threaded portion 166 with respect to the threaded bore.

In particular embodiments of an anchor hoist ring assembly 100, the flange portion 128 includes a radially outer periphery 182 and the tool engagement portion 114 comprises one or more notches at the radially outer periphery 182. Such notches may be adapted, individually or collectively, to receivingly engage a torquing tool (such as a conventional spanner wrench or the like, for example) for applying a torque to the bushing element 102 about the major axis 124. In further or alternate embodiments, the tool engagement portion may comprise two flats (not shown) at the radially outer periphery 182, the flats being generally parallel to one another and disposed on opposite sides of the major axis. In such embodiments, the flats may be adapted to be receivingly gripped by a torquing tool for applying a torque to the bushing element about the major axis. In yet other embodiments, the tool engagement portion may comprise a multiplicity of flats disposed about the radially outer periphery in generally polygonal fashion. In such embodiments, two or more of the flats being are typically adapted to be gripped by a torquing tool for applying a torque to the bushing element 102 about the major axis 124.

The tool engagement portions 114 conveniently allow a strong torque to be applied to the bushing element to counter the torque resulting from the tightening rotation of the fastener element 106 with respect to the engagement element 150. As a result, a more secure anchoring of the anchor hoist ring assembly to a pre-formed hole 116 in an object or substrate may be achieved.

Turning to FIGS. 8 and 10 for illustration, in embodiments, the retainer engagement section 152 may have a near face 140 and the anchor subassembly may include a washer element 112 adapted to adjacently engage the near face 140 and receivingly engage and cooperate with the fastener element 106 to axially confine the retainer element 104 in rotatable receiving engagement with the retainer engagement section 152.

Referring to FIGS. 11 through 15 for example, in certain embodiments of an anchor hoist ring assembly 100 the retainer element 104 may include a pair of pin apertures 188 extending between the first end 130 and the second end 132. As illustrated, for example, in FIG. 15, each such pin apertures 188 is typically offset from the minor axis and each is adapted to releasably receive a respective stud lock pin 186 for engaging an inboard detent 148 of a respective one of the pivot studs 110, thereby releaseably locking the pivot stud 110 within the stud aperture 190 and stud socket 136. As illustrated in FIGS. 11, 14 and 15, the inboard detent 148 typically takes the form of an annular groove in the pivot stud 110. When such an embodiment is in its assembled form, the pivot studs 110 extend through respective stud apertures 190 in the legs 142 of the lifting loop element 108 and into respective stud sockets 136. The insertion of the stud lock pins 186 retains the pivot studs 110 within the retainer element 104 while typically allowing the pivot studs 110 to rotate about the minor axis 138. Axial securement of the retainer element 104 between the washer element 112 and the flange portion 128 also serves to retain the stud lock pins 186 within their respective pin apertures 188. The pivot studs 110 of the embodiment of FIGS. 11 through 15 typically include a stud head 184 to secure the legs 142 from movement outward from the major axis 124, which is particularly important under heavy lifting loads.

The anchor hoist ring assembly 100 can be shipped to the customer in assembled configuration (as shown, for example, in FIGS. 2 and 12), then inserted into a pre-formed hole in a load, object or substrate, and removably and securely anchored thereto without requiring the pre-formed hole to be threaded or formed with complex engagement features.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An anchor hoist ring assembly with expansion anchor, the anchor hoist ring assembly comprising:
    (a) an anchor subassembly including:
        (i) a bushing element having a cylindrical portion with a retainer engagement section and an anchor shaft section and extending generally along a major axis, a bushing bore extending axially through the cylindrical portion, and a flange portion extending generally radially outward from the cylindrical portion generally between the retainer engagement section and the anchor shaft section, the flange portion having a tool engagement portion, the anchor shaft section having a distal end;
        (ii) a retainer element having a first end and a second end, a retainer bore extending therebetween, a pair of stud sockets disposed opposingly along a minor axis, the retainer bore being adapted to be in rotatable receiving engagement with the retainer engagement section when the hoist ring assembly is in an assembled configuration;
        (iii) a fastener element having a fastener head and a threaded portion and being adapted to extend throughout the bushing bore; and
        (iv) an engagement element having a threaded bore and a proximal end, the threaded bore extending along a bore axis and being adapted to threadedly receive the threaded portion, the proximal end and distal end having respective forms which are complimentary to each other such when the fastener element extends through the bushing bore and is threadedly received by the threaded bore, additional rotation of the fastener element can increasingly force the bore axis out of alignment with the major axis; and
    (b) a lifting loop element having a pair of legs, each of the legs having a respective pivot stud adapted to be receivingly engaged by a respective one of the stud sockets such that when the hoist ring assembly is in the assembled configuration the lifting loop element is connectedly associated with the anchor subassembly and is:
        (i) rotatable through a generally 360-degree angle about the major axis with respect to the bushing element with the minor axis remaining generally perpendicular to the major axis; and
        (ii) pivotable through at least approximately a 180-degree angle about the minor axis with respect to the anchor subassembly.

2. The anchor hoist ring assembly as defined in claim 1, in which the form of the distal end includes a distal face disposed at a distal angle with respect to the major axis, and the form of the proximal end includes a proximal face disposed at a proximal angle with respect to the bore axis, the distal angle and proximal angle being approximately equal.

3. The anchor hoist ring assembly as defined in claim 1, in which the flange portion includes a radially outer periphery and the tool engagement portion comprises a notch at the radially outer periphery, the notch being adapted to receivingly engage a torquing tool for applying a torque to the bushing element about the major axis.

4. The anchor hoist ring assembly as defined in claim 1, in which the flange portion includes a radially outer periphery and the tool engagement portion comprises a multiplicity of notches distributed about the radially outer periphery, each of the multiplicity of notches being adapted to receivingly engage a torquing tool for applying a torque to the bushing element about the major axis.

5. The anchor hoist ring assembly as defined in claim 1, in which the flange portion includes a radially outer periphery and the tool engagement portion comprises two flats at the radially outer periphery, the flats being generally parallel to one another and disposed on opposite sides of the major axis, the flats being adapted to be receivingly gripped by a torquing tool for applying a torque to the bushing element about the major axis.

6. The anchor hoist ring assembly as defined in claim 1, in which the flange portion includes a radially outer periphery and the tool engagement portion comprises a multiplicity of flats disposed about the radially outer periphery in generally polygonal fashion, two or more of the flats being adapted to be gripped by a torquing tool for applying a torque to the bushing element about the major axis.

7. The anchor hoist ring assembly as defined in claim 1, in which the anchor shaft section and the engagement element have outer diameters which are substantially the same.

8. The anchor hoist ring assembly as defined in claim 1, in which:
   (a) the flange portion has an obverse face, a flange lip protruding therefrom, and an annular groove generally disposed between the flange lip and the cylindrical portion; and
   (b) the retainer element has a boss member protruding from the second end and adapted to be received by the annular groove in rotatably slidable fashion.

9. The anchor hoist ring assembly as defined in claim 1, in which the retainer element has a pair of pin apertures, the pin apertures extending between the first end and the second end, each of the pin apertures being offset from the minor axis and each adapted to releasably receive a respective stud lock pin for engaging an inboard detent of a respective one of the pivot studs for releaseably locking the pivot stud within the respective stud socket.

10. The anchor hoist ring assembly as defined in claim 1, in which the anchor subassembly includes a washer element, the washer element being adapted to adjacently engage a near end of the retainer engagement section and receivingly engage and cooperate with the fastener element to axially confine the retainer element in rotatable receiving engagement with the retainer engagement section.

11. The anchor hoist ring assembly as defined in claim 1, in which the stud sockets have respective slot openings at generally the second end.

12. An anchor hoist ring assembly with expansion anchor, the anchor hoist ring assembly comprising:
   (a) an anchor subassembly including:
      (i) a bushing element having a cylindrical portion with a retainer engagement section and an anchor shaft section and extending generally along a major axis, a bushing bore extending axially through the cylindrical portion, and a flange portion extending generally radially outward from the cylindrical portion generally between the retainer engagement section and the anchor shaft section, the flange portion having a radially outer periphery and a tool engagement portion, the tool engagement portion comprising a notch at the radially outer periphery, the notch being adapted to receivingly engage a torquing tool for applying a torque to the bushing element about the major axis, the anchor shaft section having a distal end;
      (ii) a retainer element having a first end and a second end, a retainer bore extending therebetween, a pair of stud sockets disposed opposingly along a minor axis, the retainer bore being adapted to be in rotatable receiving engagement with the retainer engagement section when the hoist ring assembly is in an assembled configuration;
      (iii) a fastener element having a fastener head and a threaded portion and being adapted to extend throughout the bushing bore;
      (iv) an engagement element having a threaded bore and a proximal end, the threaded bore extending along a bore axis and being adapted to threadedly receive the threaded portion, the proximal end and distal end having respective forms which are complimentary to each other such when the fastener element extends through the bushing bore and is threadedly received by the threaded bore, additional rotation of the fastener element can increasingly force the bore axis out of alignment with the major axis; and
      (v) a washer element being adapted to engage a near end of the retainer engagement section and receivingly engage and cooperate with the fastener element to axially confine the retainer element in rotatable receiving engagement with the retainer engagement section; and
   (b) a lifting loop element having a pair of legs, each of the legs having a respective pivot stud adapted to be receivingly engaged by a respective one of the stud sockets such that when the hoist ring assembly is in the assembled configuration the lifting loop element is connectedly associated with the anchor subassembly and is:
      (i) rotatable through a generally 360-degree angle about the major axis with respect to the bushing element with the minor axis remaining generally perpendicular to the major axis; and
      (ii) pivotable through at least approximately a 180-degree angle about the minor axis with respect to the anchor subassembly.

13. The anchor hoist ring assembly as defined in claim 12, in which the form of the distal end includes a distal face disposed at a distal angle with respect to the major axis, and the form of the proximal end includes a proximal face disposed at a proximal angle with respect to the bore axis, the distal angle and proximal angle being approximately equal.

14. The anchor hoist ring assembly as defined in claim 13, in which the distal angle and the proximal angle are each between 25 and 35 degrees.

15. The anchor hoist ring assembly as defined in claim 12, in which the anchor shaft section and the engagement element have outer diameters which are substantially the same.

16. An anchor hoist ring assembly with expansion anchor, the anchor hoist ring assembly comprising:
   (a) an anchor subassembly including:
      (i) a bushing element having a cylindrical portion with a retainer engagement section and an anchor shaft section and extending generally along a major axis, a bushing bore extending axially through the cylindrical portion, and a flange portion extending generally radially outward from the cylindrical portion generally between the retainer engagement section and the anchor shaft section, the flange portion having a radially outer periphery and a tool engagement portion, the tool engagement portion comprising a notch at the radially outer periphery, the notch being adapted to receivingly engage a torquing tool for applying a torque to the bushing element about the major axis, the anchor shaft section having a distal end including a distal face disposed at a distal angle with respect to the major axis;
      (ii) a retainer element having a first end and a second end, a retainer bore extending therebetween, a pair of stud sockets disposed opposingly along a minor axis, the retainer bore being adapted to be in rotatable receiving engagement with the retainer engagement section when the hoist ring assembly is in an assembled configuration;

(iii) a fastener element having a fastener head and a threaded portion and being adapted to extend throughout the bushing bore; and
(iv) an engagement element having a threaded bore and a proximal end, the threaded bore extending along a bore axis and being adapted to threadedly receive the threaded portion, the proximal end including a proximal face disposed at a proximal angle with respect to the bore axis, the proximal face and distal face being adapted to slidably engage one another for radial movement of the bore axis out of alignment with the major axis, the radial movement being inducible at least in part by way of a tightening rotation of the threaded portion with respect to the threaded bore; and
(b) a lifting loop element having a pair of legs, each of the legs having a respective pivot stud adapted to be receivingly engaged by a respective one of the stud sockets such that when the hoist ring assembly is in the assembled configuration the lifting loop element is connectedly associated with the anchor subassembly and is:
(i) rotatable through a generally 360-degree angle about the major axis with respect to the bushing element with the minor axis remaining generally perpendicular to the major axis; and
(ii) pivotable through at least a 180-degree angle about the minor axis with respect to the anchor subassembly.

17. The anchor hoist ring assembly as defined in claim 16, in which the distal angle and the proximal angle are each approximately 30 degrees.

18. The anchor hoist ring assembly as defined in claim 16, in which the distal angle and the proximal angle are each between 25 and 35 degrees.

* * * * *